United States Patent [19]

Krallinger et al.

[11] 3,761,610

[45] Sept. 25, 1973

[54] HIGH SPEED FASCIMILE SYSTEMS

[75] Inventors: Robert E. Krallinger, New Milford; Donald T. Dolan, Ridgefield; Kenneth Wittmer, Newton; Jerry W. Terrell, New Milford, all of Conn.

[73] Assignee: Graphics Sciences, Inc., Danbury, Conn.

[22] Filed: Feb. 16, 1971

[21] Appl. No.: 115,189

[52] U.S. Cl. .................. 178/6, 178/68, 178/DIG. 3, 179/15.55 R, 325/38 A

[51] Int. Cl. .......................... H04n 1/40, H04n 7/12

[58] Field of Search ........................ 178/DIG. 3, 68; 325/38 A; 179/15.55 R

[56] References Cited

UNITED STATES PATENTS

| | | | |
|---|---|---|---|
| 3,223,778 | 12/1965 | Stone et al. | 178/DIG. 26 |
| 3,434,059 | 3/1969 | Kesolits | 178/68 X |
| 2,953,639 | 9/1960 | Koll | 178/DIG. 26 |
| 2,904,642 | 9/1959 | Quinlan | 178/DIG. 16 |
| 3,339,017 | 8/1967 | Quinlan | 178/DIG. 3 |
| 3,538,246 | 11/1970 | Macouski et al. | 178/DIG. 3 |
| 3,495,032 | 2/1970 | Smith | 178/68 X |
| 3,126,447 | 3/1964 | Bendell | 178/DIG. 26 |
| 3,407,267 | 10/1968 | Smith | 178/DIG. 2 |
| 3,530,385 | 9/1970 | Smith et al. | 178/DIG. 3 |

*Primary Examiner*—Howard W. Britton
*Attorney*—Cesari & McKenna

[57] ABSTRACT

A facsimile system bandwidth-compresses a source signal, derived from scanning a document whose contents are to be transmitted to a remote location, by reversing the polarity of alternate segments of the signal to thereby form a modified signal of lesser frequency content. Background suppression is provided to enhance image contrast, and automatic gain control compensates for the variable attenuation of the transmission medium. The system is also capable of operating in a non bandwidth-compressed ("slow") mode to accommodate slower transceivers.

32 Claims, 7 Drawing Figures

FIG I

HIGH SPEED FASCIMILE SYSTEMS

BACKGROUND OF THE INVENTION

1. Field of the Invention

The invention relates to facsimile transmission and reception and, more particularly, to facsimile transmission and reception in analog form using bandwidth compression techniques.

2. Prior Art

A facsimile transceiver transmits the contents of a document from a local station to a remote station where the document is reproduced by a similar transceiver. The transmitting unit scans the original document with a photodetector of small aperture to produce an electrical signal (hereinafter called the "source signal") corresponding to the amount of light reflected into the photodetector from successive elemental areas of the document and the signal is therefore indicative of the shade of print in these areas. After processing, it is transmitted to the remote station where it is used to drive a writing implement for reproducing the document.

When the transmission medium is a telephone line, as is commonly the case with facsimile transceivers, the limited bandwidth of the line restricts the rate at which information can be transmitted over it. For example, with conventional telephone lines, a transmission time of approximately six minutes is required to transmit the contents of an 8 ½ × 11 inches document with reasonable fidelity. When the document is to be transmitted over a long distance, or when a large number of documents are to be transmitted over the phone line, the toll charges involved become quite expensive, and accordingly, it is desirable to find ways to transmit the document in a shorter time with acceptable fidelity.

A desirable method of reducing transmission time is to reduce the frequency of all components of the source signal at the transmitter; the original source signal is then recovered by reversing this process at the receiver. This is known as bandwidth reduction or bandwidth compression because it reduces the effective bandwidth of the signal for a given scanning rate and thereby reduces the time required to transmit the signal.

Heretofore, various techniques have been utilized to obtain bandwidth compression of a source signal prior to transmission. These generally involve converting the analog signal supplied by the photodetector into a digital signal, generally of binary form, and subsequently processing the digital signal.

One such scheme requires sampling the source signal at uniform intervals and producing a pulse or no pulse in accordance with whether the source signal is "high" or "low" (binary technique). By thus "sampling" the signal at uniform time intervals, the maximum frequency of the resultant signal is fixed. Because of the fixed time interval between the sampling pulses in this technique, the transition from white to black of a vertical line on the document being scanned may be detected at slightly different times on successive scans and therefore will be reproduced at slightly different locations on the replica document at the receiver. This results in an undesirable wavy line in the replica.

A system which obviates this difficulty has been proposed in which fixed-interval sampling is eliminated and, instead, the analog output from the photodetector is converted into a two-level ("binary") signal whose value is 0 or 1 dependent on whether the photodetector is reading a black or a white area. In order to limit the frequency of the binary wave train so formed, the latter is then processed such that pulses of less than a predetermined duration are stretched to a pulse length equal to a fixed minimum. This signal is then further processed to form a three-level signal for transmission over a telephone line. This system avoids the position variation of white-to-black and black-to-white transitions in vertically extending lines, but it does this only by obscuring rapid successive transitions in the original document. Further, this system, as well as the preceding system, has heretofore been limited to a purely black and white reproduction, with no provision for reading or recording intermediate or "grey scale" tones.

Frequently, it is desirable to transmit documents in which the message and the background do not contrast sharply. For example, a document may be printed in blue ink on a light green background. In such a case, systems capable of reproducing shades of grey reproduce the replica as black printing on a grey background. This may be objectionable to the recipient and may even obscure the message.

SUMMARY OF THE INVENTION

*a.* Objects of the Invention

Accordingly, it is an object of the invention to provide an improved facsimile transmission system.

Another object of the invention is to provide a facsimile system which utilizes bandwidth compression to increase the transmission rate.

A further object of the invention is to provide an improved facsimile transceiver having bandwidth compression capabilities which can transmit and reproduce grey scale information.

Still a further object of the invention is to provide an effective gain control system for a facsimile transceiver.

Another object of the invention is to provide an improved facsimile transceiver having bandwidth compression capabilities which is compatible with transceivers not having such capability.

A further object of the invention is to provide an improved facsimile transmitter which is capable of supressing dark backgrounds to thereby enhance image contrast.

Still another object of the invention is to provide an improved bandwidth compressor that is especially adaptable to facsimile transceivers having grey capability.

*b.* Brief Description of the Invention

The facsimile transceiver of the present invention has a reading head which scans a document line by line and generates an analog signal indicative of the contents of the document in the usual manner. This signal varies in voltage between zero and some maximum level in correspondence with the variations in reflectance of the scanned document. For example, a minimum voltage might correspond to a black portion of the document; a maximum voltage would then correspond to a white area and intermediate voltages to various shades of grey.

The circuit includes a detector that detects points at which the source signal reaches a local minimum. Each time such a minimum is detected, the polarity of the signal is reversed so that the unipolar source signal is converted into a bipolar modified signal. In the modified signal, the frequency components are effectively reduced to half the frequency of the corresponding components in the original source signal. The modified signal then modulates a carrier for transmission over a phone line. Preferably, vestigial sideband modulation is used so that the limited bandwidth of the telephone line is most effectively used.

At the receiver, the modulated signal is synchronously demodulated to recover the modified signal. The latter is then reconverted to its original form by, for example, full wave rectification which effectively reverses the polarity reversals at the transmitter; the resultant is a replica of the source signal. This replica drives the writing head to reproduce the contents of the source document.

The system also includes a variable gain control arrangement that compensates for variations in such factors as the gain of the telephone circuit. After each line of the original document has been scanned, the transmitter sends a reference signal corresponding to the extreme of document reflectivity that produces maximum signal level (white, in the present system). The receiver then adjusts its gain in response to the reference signal.

DETAILED DESCRIPTION OF THE INVENTION

The foregoing and other and further objects and features of the invention will be more readily understood on reference to the following detailed description of the invention when taken in connection with the drawings in which.

Figure 3A:
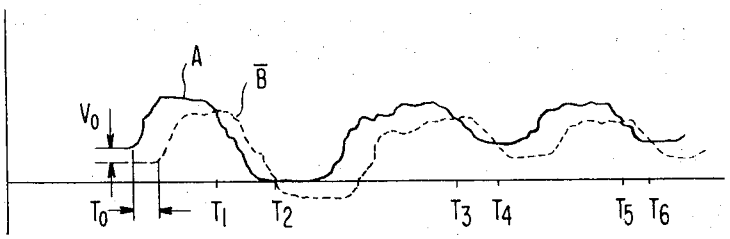
Figure 3B:
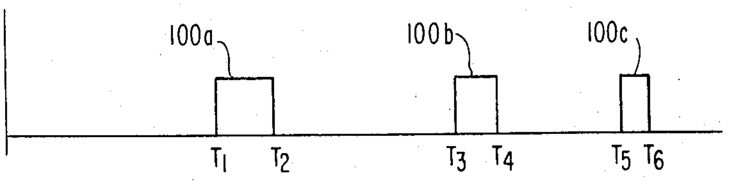
Figure 3C:
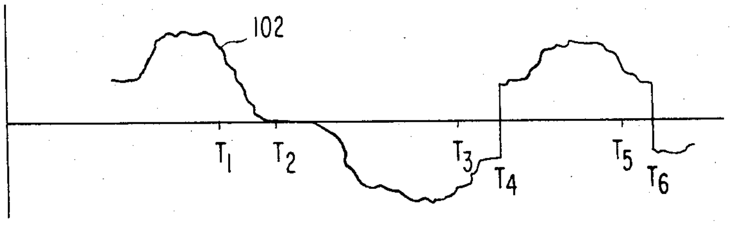
Figure 3D:
Figure 4:
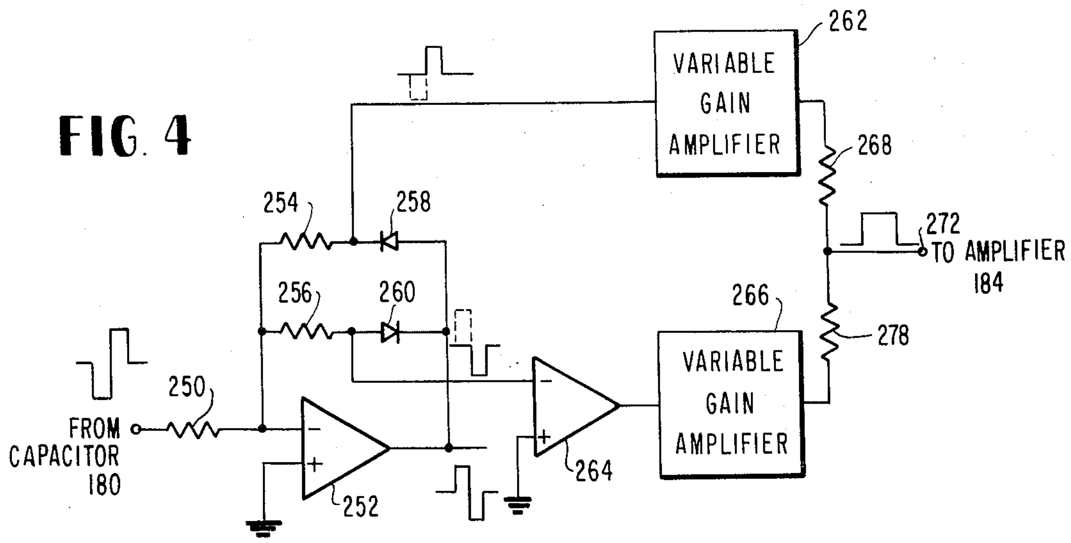

FIGS. 3*a*, 3*b*, 3*c* and 3*d* are sketches illustrating the operation of a zero crossing detector used in the present invention; and FIG. 4 is a circuit diagram of an alternate form of frequency expander which may be used in connection with the invention.

Figure 1:
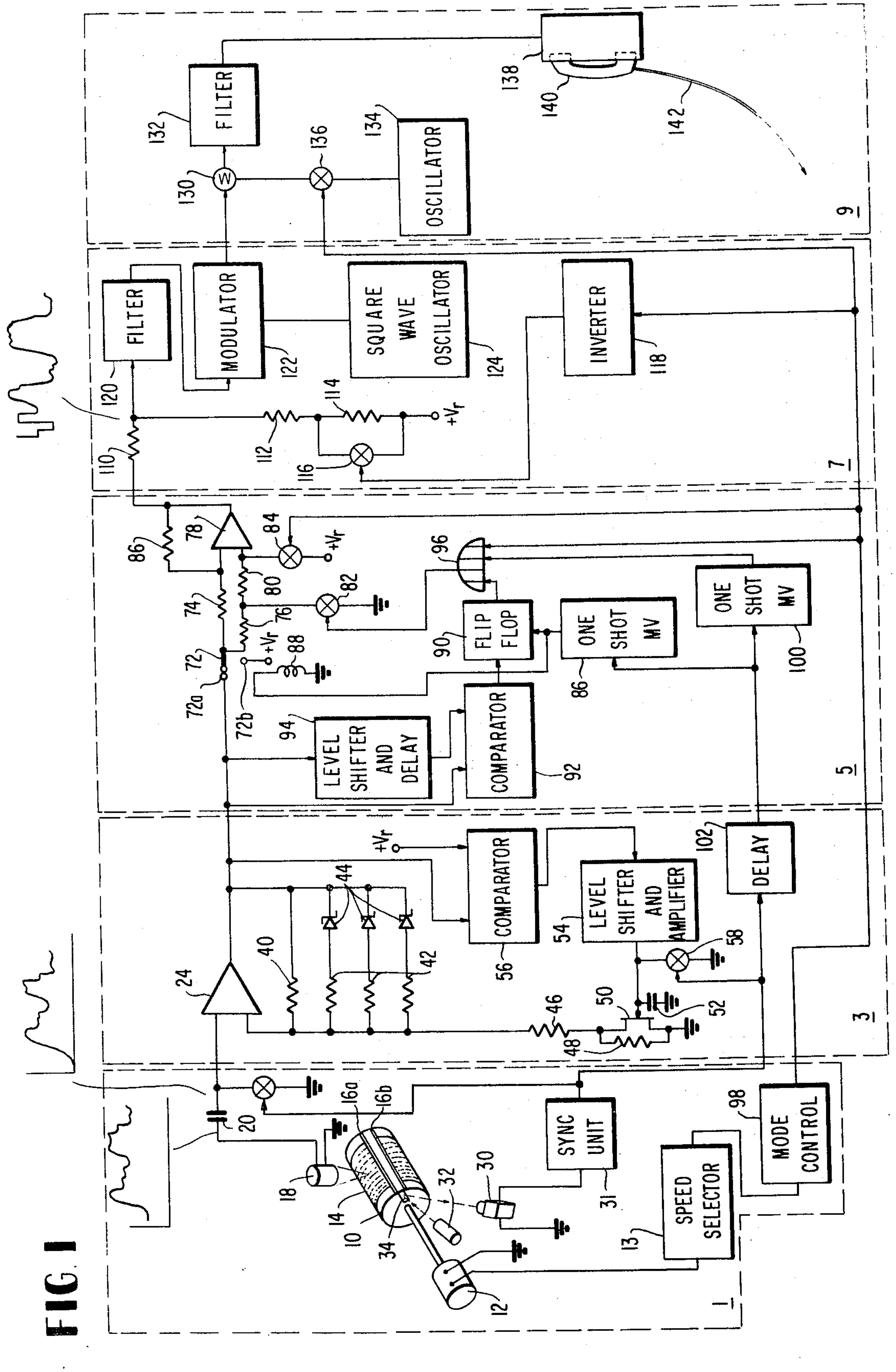
FIG. 1 is a schematic and line diagram of a facsimile transmitter constructed in accordance with the invention.

In FIG. 1, a scanning unit 1 provides electrical signals indicative of the contents of a document to a gain control circuit 3 and thence to an analog frequency compressor 5 which reduces the frequency of the signal components by a factor of two. The output of the frequency compressor then modulates a carrier signal in a modulator 7 and the modulated signal is applied to a transmitter 9 for transmission to a remote station.

Considering each of these units in more detail, the scanning unit 1 consists of a rotary drum 10 driven by a motor 12 and carrying a document 14 whose contents are to be reproduced at a remote location; the drum speed is set from a speed selector 13. The document 14 is held onto the drum 10 by means of bands 16, one of which, band 16*a*, is colored black for reasons described below. The contents of the document are read by a reading head 18 which comprises, for example, a light source for illuminating portions of the document, together with a photodetector and lens combination which scans the illuminated portions and provides an output whose magnitude is a function of the intensity of the light reflected from the document into the photodetector at the illuminated segment; this output is hereinafter called the "source signal."

The source signal is applied through a capacitor 20 to an amplifier 24 in gain control circuit 3. A waveform typical of those which pass through this capacitor is shown in FIG. 1. Capacitor 20 is charged through a switch 28 which is periodically closed on receipt of electrical impulses from a synchronizing unit 31 driven from a photodetector 30. The photodetector 30 generates a driving pulse for the synchronizing unit 31 once during each revolution of the drum 10 when light from a source 32 reflects off a mirror 34 fixed to the drum and into the photodetector; this occurs when black band 16*a* passes under reading head 18 provides a fixed reference for the drum position and thus the position of the document 14 relative to the head 18.

The capacitor 20 provides a zero reference level for the output of the reading head 18. It does this by charging up to the DC output of the head 18 during the time switch 28 is closed, that is, during the time the black band 16*a* is passing under the head. Since the capacitor 20 is in series with the input to the amplifier 24, the net input to this amplifier is equal to the output of the head 18 minus the DC voltage on the capacitor 20. Accordingly, the "zero" reference level of the amplifier corresponds to the maximum black intensity, while the maximum positive level corresponds to white; intermediate levels correspond to shades of grey.

The capacitor 20 is sufficiently large to hold its charge throughout the time required to scan one line on the document. At the beginning of the next scanning line, the synchronizing unit 31, in response to the photodetector 30, briefly closes the switch 28 to recharge the capacitor 20, so that it can again be set to its quiescent value for the duration of this scanning line.

The amplifier 24 has a negative feedback resistor 40 connected around it. It also has a number of resistors 42 and series Zener diodes 44 connected in parallel with the resistor 40. The diodes 44 have different "break down" voltages. Thus they operate in a well-known manner, to compensate for the nonlinear output of the sensor lead 18. In particular, the uncompensated characteristics of the head 18 are such that its output is compressed at low output levels (corresponding to black or dark areas) with respect to its output at high levels (corresponding to white areas). The feedback arrangement decreases the amplifier gain in steps as the input voltage increases, thereby providing an ampifier output voltage that is substantially linearly related to the shade of the document portion being sensed at any given time.

A further series pair of resistors 46, 48 are connected between ground and one end of the resistors 40 and 42. A field effect transistor 50 is connected in shunt across the resistors 48; a capacitor 52, connected between the gate and the drain of the transistor 50, sets the operating point of this transistor. The capacitor 52 is charged from a level shifter and amplifier circuit 54 which is driven from a comparator 56 having a first input from the output of the amplifier 24 and a second input from a fixed reference source. The capacitor 52 is periodically discharged to ground through a switch 58 which is operated from the synchronizing unit 31 whenever the black band 16a passes under the head 18.

The transistor 50, capacitor 52, level shifter and amplifier 54, and comparator 56 form an automatic gain control circuit for setting the overall gain of the amplifier 24. When the output of the ampfliier 24 is above the level of the reference voltage applied to the comparator 56, the comparator provides an output which, after amplification by the amplifier 54 and adjustment of its level to properly drive the transistor 50, is applied to the capacitor 52 to charge this capcitor. This tends to drive the transistor 50 toward the "off" or non-conducting state, i.e. it increases the resistance which this transistor presents between its source and drain terminals, respectively. Accordingly, the amplfiier feedback voltage is increased and the gain of the amplifier is thereby decreased.

The gain of the amplifier is reduced by this mechanism to the point at which the maximum output of the amplifier is just equal to the reference level applied to the comparator 56. When this point is reached, the capacitor 52 ceases charging, and the bias voltage applied to the transistor 50 by the capacitor 52 remains fixed for the rest of the scanning line.

In scanning a line, the head 18 first "sees" the black band 16a which sets the zero level for the amplifier 24. It then "sees" the margin of the document which, in general, is an area of maximum reflectivity and thus maximum photodetector output. In consequence, the amplifier gain will be set at the beginning of each line by this maximum output and will remain set for the duration of the line.

The output of the amplifier 24 is applied through a terminal 72*a* of a single-pole, double throw switch 72 to the junction of a pair of resistors 74 and 76 in the frequency compressor 5; the other terminal 72*b* of the switch is connected to a reference voltage $+V_r$. The resistor 74 is connected directly to a first input terminal of a differential amplifier 78, while the resistor 76 is connected through a resistor 80 to a second input terminal of this amplifier. The junction of the resistors 76 and 80 is connected to ground via a normally open switch 82, while the second input terminal of the amplifier 78 is connected to a positive reference voltage $V_r$ via a switch 84 and a reisstor 79. A resistor 86 connected between the output and input of amplifier 78 provides negative feedback; the resistor 86 is equal in magnitude to the resistor 74 to produce unity gain.

The switch 72 is driven from a monostable multivibrator 86 through a coil 88. The multivibrator also "sets" a flip-flop 90 and holds it in this state for the duration of the pulse output. The state of the flip-flop is reversed on receipt of a signal from a comparator 92 having the output of the amplifier 24 applied as a first input and a level-shifted, delayed replica of this signal as a second input via level shifter and delay circuit 94. The flip-flop 90 drives the switch 82 through an OR gate 96. When the flip-flop is "set," its output is "low" and gate 82 remains open; when "reset," its output is high and this closes switch 82. The latter is also driven from a mode control switch 98 and from a monostable multivibrator 100 which has a pulse duration of half that of the multivibrator 86 for reasons to be explained below. The multivibrators 86 and 100 are triggered from the synchronizing control unit 31 via a delay unit 102 after the black band 16*a* has passed under head 18.

The frequency compressor 5 halves the frequency of the source signal applied to it. It does this by searching for local minima in the source signal and reversing the polarity of the amplifier 78 to thereby reflect alternate signal segments about the reference axis to form a modified signal whose components are half the frequency of the corresponding components of the source signal. Although the local minima may be determined by numerous techniques, in the preferred embodiment described herein the minima are found by comparing the source signal with a level-shifted, time-delayed replica of this signal; this is accomplished in the comparator 92, which provides an output as long as one input, for example the replica, exceeds the other in magnitude.

Referring now to FIG. 3*a* as well as to FIG. 1, a typical source signal, in solid lines, is shown together with a level-shifted, time delayed replica of this signal, in dotted lines; the replica is shifted in the negative direction by $V_o$ volts and delayed in time by $T_o$ seconds. As the amplifier output returns toward the zero reference level after an excursion therefrom, the signal replica rises about the signal itself at the point marked $T_1$ and then falls below the signal itself at $T_2$, when the rate at which the signal is decreasing itself decreases for an interval at least as long as the interval $T_o$. A similar pattern occurs at the points marked $T_3$ and $T_4$. The points $T_2$, $T_4$, $T_6$, are herein denoted as "local minima." These points are the points at which the amplifier 78 switches the polarity of its gain as will now be described in detail.

When the replica of the signal rises above the signal itself at the point $T_1$, (FIG. 3*a*), the comparator 92 (FIG. 1) switches "on" and generates an output 100*a* as shown in FIG. 3*b*. When the replica later falls below the original as at $T_2$, the comparator returns to its "off" state; the comparator thus provides a rectangular output between $T_1$ and $T_2$. Similar outputs are generated by the comparator between the times $T_3$–$T_4$ and $T_5$–$T_6$. These outputs are applied to the flip-flop 90 and cause this flip-flop to alternate between its two stable states. In particular, the trailing edge of the pulse 100*a* switches the flip-flop 90 to one stable state while the trailing edge of the pulse 100*b* switches the flip-flop 90 to its opposite stable state. In one state (the "set" state) the flip-flop 90 opens the switch 82. Accordingly, the output of the amplifier 24 is applied simultaneously to both input terminals of the amplifier 70 through the resistor 74 and the resistors 76, 78 respectively, and the amplifier 78 operates with a gain of +1, i.e. its output is a replica of the input. In its other state (the "reset" state) the flip-flop 90 closes the switch 82. This grounds the junction of the resistors 76 and 80 and thereby switches the amplifier 78 to a gain of −1 so that its output is an inversion of its input.

The resulting output of the amplifier 70 is shown at 104 in FIG. 3c. As seen therein, this signal is positive up to the time $T_2$, is negative from the time $T_2$ to $T_4$, is positive in the interval $T_4$ to $T_6$, etc. The signal 104 thus switches betweeen positive and negative reproductions of the input to the amplifier 70, the switching occurring at the "local minima" of the input signal. On comparing FIGS. 3*a* and 3*c*, it will be seen that, with the exception of sharp transitions such as at $T_4$, the unipolar analog waveform of FIG. 3*a* is reduced to a bipolar analog waveform of half the frequency, that is, it undergoes bandwidth compression. The sharp transistions are removed by a low pass filter, as described below. Thus, the signal 104 can be transmitted over a transmission line of half the bandwidth required to transmit the source signal from which it was obtained.

In order to establish a standard amplitude reference level for the facsimile signal at the receiver, a "preface" consisting of positive and negative reference pulses of fixed amplitude are added to the frequency-compressed signal at the beginning of each scanning line; a waveform including these pulses is shown at the output of amplifier 78 in FIG. 1. The amplitude of these pulses is equal to the magnitude of the reference voltage $V_r$ to which the source signal has been limited by means of amplifier 24 and its associated gain control circuitry. The reference level is established by means of the switch 72 in conjunction with multivibrator 90 and synchronizing unit 31.

Specifically, as noted above, the photodetector 30 provides an output pulse once during each revolution of the drum 10 whenever the black band 16*a* passed under the head 18. This causes the synchronizing unit 31 to emit a pulse of controlled length which is applied to monostable multivibrators 86 and 100 through delay unit 102. The unit 102 delays this pulse for a time sufficient for the drum to carry the black band past the head 18. When the multivibrators 86 and 100 are triggered, they emit pulses of controlled length. The pulse output from the multivibrator 86, having a duration twice that of the pulse output from multivibrator 100, "sets" flip-flop 90 and thus removes any drive to switch 82 from flip-flop 90. Also, the output of multivibrator 86 energizes coil 88 and moves the arm of switch 72 to contact 72*b;* this applies a voltage $+V_r$ to the input of amplifier 78. Simultaneously, the output of multivibrator 100 closes switch 82 to thereby ground the junction of resistors 76 and 80. This sets the gain of amplifier 78 to $-1$ and the amplifier output is thus $-V_r$ volts. After an interval equal to the pulse length of the multivibrator 100 (equivalent to half the pulse length of the multivibrator 86), the drive to switch 82 is removed and the switch opens, thereby setting the amplifier gain to $+1$. The amplifier output is then held at $+V_r$ volts for the duration of the pulse length of multi-vibrator 86. Thus a "preface" is formed for each line.

The output of the amplifier 78 is applied to a modulation index circuit consisting of a series resistor 110, and a pair of series-connected shunt resistors 112 and 114 to which a reference voltage, for example $V_r$, is applied. A normally closed switch 116 connected across resistor 114 is driven from the mode control 98 through an inverter 118. The output of the modulation index circuit is a weighted sum of the output of the amplifier 70 and the reference voltage $V_r$. Effectively, this circuit converts the amplitude excursions of the output of amplifier 70, which may include positive and negative excursions, to unipolar excursions within a fixed range of amplitudes which can then be modulated onto a carrier to achieve a predetermined modulation index.

The output of the modulation index circuit is applied to a low-pass filter 120 which performs two functions. First, it smooths the sharp transients (such as shown at times $T_4$ and $T_6$ in FIG. 3*c*) which may accompany the polarity reversals in the baseband signal. Second, it removes from the baseband signal those high frequency components which lie beyond the passband of the transmission medium, thus reducing distortion in the transmission process. To accomplish this, the filter 120 may have a bandwidth of approximately 1200 Hz for signals to be transmitted over a phone line.

The filtered baseband signal is then applied to a switching type modulator 122 which is driven from a square wave oscillator 124; the latter provides a well defined square wave with sharp transitions to drive the modulator. For the case where the modulated signal is to be transmitted over a telephone line, the oscillator 124 may advantageously operate at a frequency of 2,050 Hz.

The modulated baseband signal is applied to a summing junction 130 and thence to a vestigial sideband filter 132 which removes essentially all but a trace of one of the sidebands while leaving the other sideband essentially intact. In the present case, the lower sideband is selected for transmission so that the upper sideband is attenuated by the filter 132. A control oscillator 134 also supplies a control signal to the summing junction 130 through a switch 136 which is actuated from the mode control 98. The oscillator 134 supplies to the summing junction 130 a pure tone at a frequency of, for example, 1500 Hz, which is within the passband of the transmission line but which differs from the modulating frequency; the purpose of this will be explained more fully below.

The output of the filter 132 is applied to an acoustic coupler 138 which couples the modulated baseband signal into a telephone handset 140 for transmission over a line 142 to a remote receiver. A coupler of suitable form is shown in U.S. Pat. application Ser. No. 842,670, entitled "Telephone Handset Adapter," filed July 17, 1969, and assigned to the assignee of the present invention, and now abandoned.

As noted previously, the transmitter of FIG. 1 may operate in either one of two modes, dependent on the setting of mode control unit 82. Specifically, the transmitter is compatible with a receiver which is not bandwidth-compressed and which operates with a unipolar analog facsimile signal having a lower modulation index and in which the output levels corresponding to black and white are reversed. This compatibility is achieved as follows:

The mode control 98 has two states, a high speed state corresponding to a transmission rate of approximately three minutes for a standard 8 ½ × 11 inches document and a low speed state corresponding to a transmission rate of approximately six minutes for such a document. When unit 98 is in its high speed state, switch 84 is open, switch 82 is open as long as it is not closed from flip-flop 90, switch 116 is closed, and speed selector 13 drives drum 10 at a rate corresponding to a 3 minute scanning speed. As a result, the gain of the amplifier 70 alternates between $+1$ and $-1$ in accordance with the output of the flip-flop 90 and the output of the amplifier 78 is therefore bandwidth compressed. Further, the output of the inverter 118 is "high" and this closes the switch 116, thus, shorting out the resistor 114 and providing the greater modulation index.

When, the other hand, the unit 82 is in the low speed mode, it closes the switches 72, 82 and 84, opens the switch 116, and drives the drum 10 at a slower speed. The result of this is that the gain of the amplifier 78 is set to $-1$, while the positive input terminal of this amplifier is clamped to the reference voltage $V_r$ through the switch 84. This shifts the output voltage upwardly by an amount $V_r$. The combined effect of the negative gain and the upward level translation is that the baseband signal now undergoes an excursion from a minimum of zero voltas to a maximum of $V_r$ volts, with a "white" level corresponding to the zero voltage and a "black" level corresponding to the positive reference voltage. Further, the modulation index is set at its lower value, since the resistor 114 is now effectively in series with the resistor 112.

Thus, the mode control unit 98 selects the modulation index for the signal to be transmitted, determines whether or not it is to be bandwidth compressed, sets the reference level and polarity for the signal, and selects the appropriate drum speed.

Figure 2:
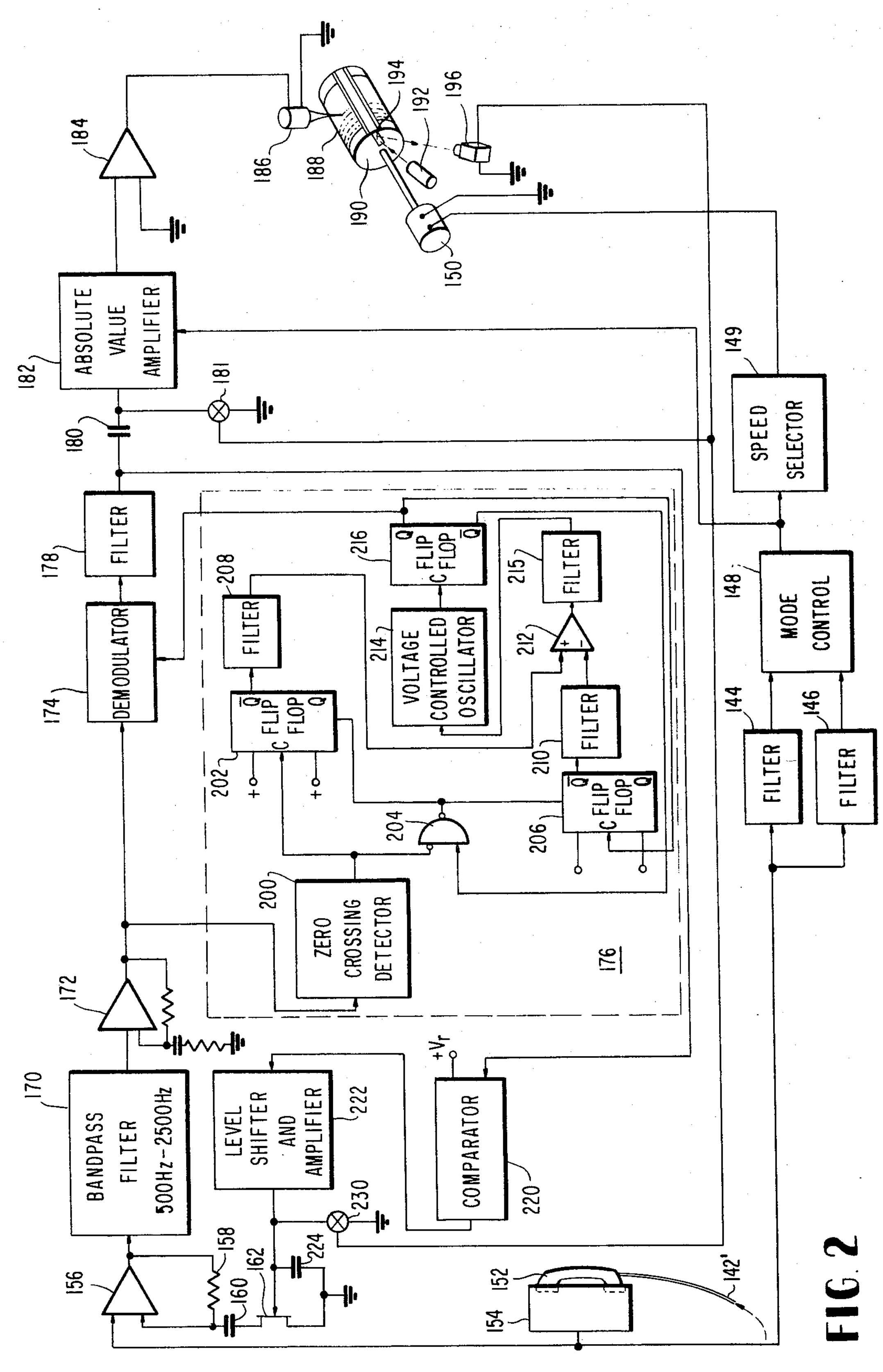
FIG. 2 is a schematic and line diagram of a facsimile receiver corresponding to the transmitter of FIG. 1.

The receiver portion of the facsimile transceiver is shown in FIG. 2. The modulated facsimile signal from the transmitter is received on the line 142' and there applied to a telephone handset 152. A coupling chamber 154 transforms the signals received by the handset 152 into electrical signals which are applied to an amplifier 156. The coupler 154 may be of the type shown in U.S. Pat. application Ser. No. 842,670, referred to above. Alternatively, it might comprise an inductive coupler which responds to the signal on the line 142' to generate a replica of this signal for application to the amplifier 156.

Mode signalling tones in the incoming signal are passed by first and second filters 144 and 146. respectively; these filters in turn are connected to a mode control unit 148 which controls a speed selector 149. The filter 144 is a high-Q bandpass filter centered at 2050 Hz. If the transmitter is operating in the low-speed (6 minute) mode, it will transmit a pure tone at 2050 Hz during an initial "prepare to receive" signalling time and the filter 146 alone will provide an output to the speed selector 148. If, in contrast, the transmitter is operating in the high-speed (3 minute) mode, it will transmit pure tones at both 2050 Hz and 1500 Hz at the initial signalling time and both filters provide an output. The mode control unit 148 responds to these outputs to provide a signal indicating operation in the appropriate mode. The speed selector 149 in turn drives the receiver drum motor 150 at a high speed when both filters provide an output. The synchronization need occur, of course, only at the start of the reproduction process and prior to the time that fascimile information is transmitted. A circuit suitable for synchronizing the transmitter and receiver drums is shown in the copending application of Lewis A. Latanzi and Edward G. Keplinger, Ser. No. 781,063, filed Dec. 4, 1968, entitled "Self-Synchronizing Graphic Transmission and Reproduction System" and assigned to the assignee of the present invention.

The coupler 14 is connected to an amplifier 156 which has a feedback resistor 158 connected around it in series with a capacitor 160 and a field effect transistor 162 connected between one of its input terminals and ground. The transistor 162, in conjunction with the resistor 158, provides a means of varying the gain of the amplifier for the purpose of automatic gain control. The capacitor 160 eliminates 60 Hz pickup.

The output of the amplifier 156 is applied to a bandpass filter 170 whose passband coincides with the frequency band of the modulated facsimile signal. In the case of a vestigial sideband signal having a carrier frequency of approximately 2,000 Hz and intended for transmission over a standard telephone line as in the present case, this passband may extend from approximately 500 Hz to approximately 2500 Hz.

The output of the filter 170, in turn, is amplified in an amplifier 172 provided with negative feedback as shown. The output of amplifier 172 is then demodulated in an amplitude demodulator 174 driven from a phase lock loop 176. The loop 176 generates a demodulating signal in synchronism with the carrier with which the received signal was modulated, as described more fully below. The demodulated output is filtered by a low pass filter 178 and then applied through a capacitor 180 to an absolute value amplifier 182 which acts similarly to a rectifier in that it re-inverts the inverted portions of the demodulated signal. Of course, when unipolar, slow-speed facsimile signal is being received, no inversion need take place and the mode control unit 148 disables the inverter. A normally open switch 181, when closed, connects one end of capacitor 180 to ground. The output of the amplifier 182 is then applied to a driver amplifier 184 and thence to a writing head 186 which reproduces the original document on a copy sheet 188 attached to a drum 190 which is driven by motor 150. A light source 192, mirror 194, and photodetector 196 generate drum synchronizing pulses in the manner described in connection with the transmitter.

Amplifier 172 also drives the phase lock loop 176 via a zero crossing detectOr 200. The detector 200 drives the complement input of a flip-flop 202 and also a negating input of a NAND gate 204 whose output in turn is connected to the set inputs of the flip-flops 202 and 206. The "Q" ("set") outputs of the flip-flops 202 and 206 are connected through filters 208 and 210 as inputs to an amplifier 212. The output of the amplifier 212 drives a voltage-controlled oscillator and squarer 214 via low pass filter 215. The oscillator 214 in turn drives a flip-flop 216. The Q output of the flip-flop 216 is connected as an input to the demodulator 174 and is also connected to the complement input of the flip-flop 206; the Q output of the flip-flop 216 is connected as a second input to the NAND gate 204.

The zero crossing detector 200 generates square waves corresponding to the zero crossings of the carrier component at the output of the amplifier 172. Similarly, the flip-flop 216 generates square waves corresponding to pulses from the oscillator 214. The oscillator 214 is nominally set to operate at twice the desired carrier frequency, so that it drives the flip-flop 216 at exactly the carrier frequency. It can, however, make slight excursions above and below its nominal frequency for purposes of achieving frequency and phase lock as will now be explained in detail.

Assume, for the moment, that the flip-flop 216 is operating at exactly the amplifier 172 and that the Q output is in phase with it. The Q output of the flip-flop 216 is then out of phase with this component but in phase with the inverted square wave from the detector 200. The NAND gate 204 then sets the flip-flops 202 and 206 (that is, the Q outputs of these flip-flops go "low") on alternate half cycles when the outputs of the zero crossing detector 200 and the flip-flop 216 return to a "low" level. At intermediate times, when the outputs of the detector 200 and the flip-flop 216 transfer from "high" to "low," the flip-flops 202 and 206 are "reset," that is, their Q outputs go "high." Accordingly, the flip-flops 202 and 206 are reset synchronously with the negative-going transitions of the detector 200 and the Q output of flip-flop 216, and are "set" when both are "low" simultaneously. Therefore, a zero net input is applied to the amplifier 212, since both flip-flops are set and reset simultaneously, thus resulting in a zero output. With zero output driving the oscillator 196, the oscillator remains locked at the frequency and phase at which it is operating.

Assume, now, that the phase of the Q output of flip-flop 216 lags behind the phase of the square wave output of the detector 200. When this occurs, the time at which the flip-flops 202 and 206 are "set" will be identical for both flip-flops, but the time at which these flip-flops are "reset" by an input pulse at the complement input will differ. Specifically, when the phase of flip-flop 216 lags behind the phase of the detector 200, the resetting of flip-flop 202 will occur before resetting of flip-flop 206, thereby producing a pulse whose duration is proportional to the phase lag. This results in a net positive voltage being applied to the positive input terminal of the amplifier 212, thereby driving the voltage controlled 214, and thus the flip-flop 216, toward a higher frequency. The higher oscillator frequency causes the phase of the Q output of flip-flop 216 to lag behind the detector output phase by increasingly smaller amounts. As the phase decreases, the difference between the outputs of the flip-flops 202 and 206 correspondingly decreases so that the driving voltage to the amplifier 210 decreases and the frequency of the oscillator 214 drops back toward its reference frequency. When the phase of the Q output of the flip-flop 216 finally matches the phase of the carrier, the flip-flops 202 and 206 are operating in synchronism, the net input to the amplifier 210 is zero, and flip-flop 216 is then locked in both frequency and phase to the carrier.

If, instead of lagging in phase, the flip-flop 216 leads the detector 200 in phase, the flip-flop 206 is reset prior to the flip-flop 202 and the amplifier 212 produces a negative output which drives the oscillator 214 toward a lower frequency until the phase difference is decreased to zero. The details of this are just the reverse of those described above for a phase lead and, accordingly, will not be described further.

In order to standardize the reproduction and insure proper contrast by removing nonlinearities caused by the transmission, a gain control circuit is provided at the receiver to fix the gain of the receiver circuit in accordance with the level of the received level reference signals. The gain control circuit comprises a comparator 220 connected to receive the output of filter 178 as a first input. This input is compared with a standard reference voltage $+V_r$, and an output is generated by the comparator when the input exceeds the reference voltage. The comparator output is amplified in an amplifier 222 and then charges a capacitor 224 which sets the operating point of the transistor 162. As the capacitor 224 charges, it increasingly drives the field effect transistor 162 to cut-off and. thus, increases the impedance between the transistor source and drain; this decreases the gain of the amplifier 156 until the maximum level of the demodulated signal no longer exceeds $+V_r$. The gain of the amplifier 156 then remains at this level for the remainder of a scanning line. At the beginning of the next line, the output of photodetector 196 momentarily closes a switch 230 to discharge capacitor 224. The capacitor is then prepared to accept a new charge to establish a new gain level for the new scanning line. At the same time, switch 181 is momentarily closed to charge capacitor 180 to the DC level of the demodulated signal to thereby re-establish a zero reference level for the writing head.

When the facsimile receiver is acoustically coupled to the telephone, the carbon granules in the telephone handset may sometimes tend to pack together, thus introducing non-linearities in the received signal. Frequently, this manifests itself as a greater attenuation of the extreme amplitude excursions of the received modulated signal than the lower amplitude portions, so that the positive and negative portions of the demodulated signal suffer unequal attenuation. In consequence, it is ecessary to control the amplitude of each portion separately to ensure proper reconstruction of the original source signal. This is accomplished with the aid of the circuit of FIG. 4, which replaces the absolute value amplifier 182 of FIG. 2. As shown in FIG. 3, the demodulated facsimile signal from the capacitor 180 is applied through a resistor 250 to an amplifier 252. Resistors 254 and 256 in series with diodes 258 and 260 respectively are connected to provide negative feedback around the amplifier. The signal at the junction of the resistor 254 and diode 258 is applied to a noninverting amplifier 262 whose gain is automatically controlled to limit the maximum output amplitude to a fixed value while the signal at the junction of the resistor 256 and diode 260 is applied through an inverter 264 to a non-inverting amplifier 266 also having automatic gain control provisions. The outputs of amplifiers 262 and 266 are then coupled through resistors 268 and 270 to an output terminal 272 to the amplifier 284 of FIG. 2.

When the input to amplifier 252 is negative, the output is positive, and diode 258 is then forward biased, diode 260 is reverse biased, and the junction of resistor 254 and diode 258 is at the output potential, while the junction of resistor 256 and diode 260 is at approximately round potential. Accordingly, a positive input is applied to amplifier 262 and a positive output is applied to the output terminal 272. When, on the other hand, the input to amplifier 252 is positive, its output is negative, diode 258 is reverse biased, diode 260 is forward biased, the junction of resistor 254 and diode is at approximately ground potential, and the junction of resistor 256 and diode 260 is at the output potential. Accordingly, the input to inverter 264 is negative, the input to amplifier 266 is thus positive, and a positive output is again applied to the output terminal 272. Thus, whatever the polarity of the input, a positive output always results and the original source signal is thus reconstituted.

The gain-controlled amplifiers 262 and 266 may be of any convenient form, for example, the type shown in FIGS. 1 and 2. By providing separate amplifiers for the positive and negative portions, the reference level of each portion is set independently so that distortions caused by certain non-linearities in the modulation-transmission-detection process are corrected.

From the foregoing, it will be seen that we have provided an improved facsimile transmitter and receiver which rapidly transmits the contents of a document and reproduces it at a remote location. The transmitter and receiver are capable of transmitting and receiving in either a bandwidth-compressed mode or a non-bandwidth compressed mode in accordance with the needs and equipment of the sender and user. Provision is made for transmitting and reproducing a "grey" scale, that is, a color scale including black and white as well as intermediate gray tones. This enables the transmission of pictures and similar graphic copy with greater fidelity. Compensation is provided for the inherent non-linearities of the reading process, as well as for non-linearities in the modulation-transmission-detection process.

The bandwidth-compression circuitry is simple, yet effective, and allows more effective utilization of the limited bandwidth of the transmission medium. Although described herein with particular reference to a facsimile transmission and reception system, it will be understood that it is not so limited, but indeed may be utilized for the transmission of information of all types wherever a transmission channel of limited bandwidth is utilized. Additionally, although the preferred embodiment of the bandwidth compressor herein switches on detecting local minimia, the compressor may also be adapted to switch on local maxima. In a braoder sense, therefore, the bandwidth compressor described herein switches on detecting inflection points corresponding to either local minima or local maxima of the signal to be frequency compressed.

It should be noted that location of the inflection points will be in part dependnent on the time delay between the signal to be compressed and its delayed replica, as well as on the magnitude and direction of the level shift between the signal and its replica. These quantities determine the minimum variation in the rate of change of the signal being compressed which is necessary to trigger the switching. Additionally, the magnitude of the level shift defines a "threshold" for noise immunity and must be chosen with this in mind.

Various changes may be made in the foregoing by those skilled in the art without departing from the spirit and scope of the invention and it is to be understood that the foregoing is to be interpreted as illustrative only, and not in a limiting sense.

Having described our invention, we claim:

1. A facsimile transmitter for transmitting the contents of a document to a remote location comprising:

A. means for scanning the document and generating a continuous electrical signal indicative of its contents;

B. variable threshold means for detecting local minima in said signal;

C. means for amplifying said signal with alternate first and second polarities as the signal passes through successive local minima; and D. means for transmitting the amplified signal to a remote receiver.

2. Apparatus according to claim 1 in which the signal translating means comprises an amplitude modulator having means for selecting the modulation index of the signal, the modulation index setting means comprising:

A. a summing junction;

B. first weighting means connecting the output of the variable gain amplifier to said summing junction;

C. second weighting means connection to said summing junction a reference voltage corresponding to the comparator reference voltage; and D. switching means for varying the second weighting means whereby the proportion of the weighting voltage applied to the summing junction may be varied.

3. A facsimile transmitter according to claim 1 which includes means for scanning said document at a plurality of different scanning rates and means providing to a remote receiver a siganl indicative of the rate at which the document is being scanned.

4. Apparatus according to claim 1 in which the scanning means comprises a light source for illuminating the document and a photodetector for detecting light reflected from the document, and which includes means for compensating for the light detection characteristics of the photodetector, said compensating means comprising means for decreasing the amplification which said signal undergoes in inverse relation to the amplitude of said signal to thereby compress the upper range of amplitudes of said signal relative to the lower ranges thereof.

5. Apparatus according to claim 4 in which said compensating means includes:

A. a plurality of impedances;

B. a plurality of Zener diodes in series with respective ones of said impedances; and C. means connecting said impedances and diodes in feedback relation around said amplifier to thereby vary the gain of said amplifier inversely with the output of the scanning means.

6. Apparatus according to claim 1 which includes means for periodically establishing a reference level for said signal, said means comprising:

A. a capacitor connected in series with the output of the scanning means, and

B. means for periodically charging said capacitor to a standard level whereby said reference level may periodically be re-established.

7. Apparatus according to claim 6 in which said periodic charging means charges said capacitor after the scanning of each line on the document whereby said reference level is re-established for each scanning line.

8. Apparatus according to claim 7 in which the charging means includes a switch operable in synchronism with the rotation of a drum on which the document to be transmitted is mounted to charge the capacitor after each revolution of the drum.

9. Apparatus according to claim 1 which includes means for limiting the maximum amplitude of the signal from said scanning means, said limiting means comprising:

A. an amplifier for amplifying the signal and having means to vary, the gain of the amplifier in accordance with the peak amplitude of the signal during a given scanning interval.

B. a comparator for comparing the amplifier output with a reference voltage which is to determine the maximum amplitude of the signal;

C. an accumulator responsive to the comparator for accumulating a magnitude corresponding to the peak amplitude of the signal during the given interval;

D. switching means responsive to the accumulator for modifying the amplifier gain in inverse relation to the accumulator magnitude; and E. means for periodically resetting the accumulator to thereby enable the re-establishment of the gain of the amplifier.

10. Apparatus according to claim 9 in which the accumulator is a capacitor connected in charging relation to the comparator and which includes means to dishcarge the capacitor after the scanning of each line on the document.

11. Apparatus according to claim 10 in which the means for periodically discharging the capacitor comprises a switch operable in synchronism with the rotation of a drum on which the document to be transmitted is mounted to discharge the capacitor after each revolution of the drum.

12. A facsimile receiver for reproducing the contents of a document in accordance with a continuous electrical signal representative of a source signal derived from said document and transmitted to it from a remote transmitter after bandwidth-compression by inverting portions thereof in accordance with a variable threshold means said receiver comprising:

A. means for amplifying said signal in an amplifier whose gain is dependent on the maximum amplitude components of said signal;

B. means for reinverting portions of the received signal corresponding to portions of the source signal which have been phase-inverted prior to transmission to thereby reconstitute said source signal; and C. means applying the reconstituted signal to a writing head to thereby reproduce said document.

13. A facsimile receiver according to claim 12 which includes means for demodulating the received signal prior to reinverting portions thereof, said demodulating means comprising:

A. an oscillator providing an output at a frequency dependent on inputs applied thereto;

B. a first bistable device driven by said oscillator;

C. a demodulator 1. having the output of the bistable device connected as a first input thereto;
2. having the output of said amplifier connected as a second input thereto;
3. responsive to said inputs to provide an output representative of said source signal;

D. a zero crossing detector providing outputs indicative of the zero crossings of the modulated signal;

E. second and third bistable devices 1. responsive to the outputs of the zero crossing detector and the first bistable device respectively;
2. providing outputs whose durations
   a. are equal when the outputs of the zero crossing detector and the first bistable device are in phase;
   b. are unequal when the outputs of the zero crossing detector and the first bistable devices are out of phase;

F. a difference amplifier having connected as inputs thereto the respective outputs of said second and third bistable devices, and G. means connecting the output of the difference amplifier as an input to the oscillator to drive said oscillator at a frequency which minimizes the phase and frequency difference between the outputs of the zero crossing detector and the first bistable device.

14. A facsimile receiver according to claim 12 in which the means for reinverting portions of the received signal comprises a rectifier for converting the frequency-compressed bipolar signal to a unipolar signal.

15. A facsimile receiver according to claim 12 in which the means for reinverting portions of the received signal comprises:

A. an amplifier having an input and an output;

B. a first rectifier poled in a first direction and connected in series with a first impedance between the amplifier input and output;

C. a second rectifier poled in a direction opposite to the first rectifier and connected in series with a second impedance between the amplifier input and output;

D. a first channel output lead connected to a node common to said first rectifier and first impedance for receiving signals corresponding to a first input polarity;

E. a second channel output lead connected to a node common to said second rectifier and second impedance for receiving signals corresponding to a second input polarity;

F. means for inverting the polarity of the signal in one of said channels; and

G. means for recombining the signals passed by said channels to thereby form a replica of the source signal.

16. A facsimile receiver according to claim 12 in which the means for reinverting portions of the received signal includes:

A. first and second channels for passing different portions of the received signal with first and second polarities, respectively; and B. means for summing the outputs of said channels to provide a unipolar signal comprising a replica of said source signal.

17. A facsimile receiver according to claim 16 in which each said channel includes variable-gain amplifying means for setting the gain level of each channel separately whereby level-dependent nonlinearitites introduced during transmission or reception may be compensated for.

18. A facsimile receiver according to claim 12 which includes:

A. an energy storage element;

B. means responsive to the received signal to store in said element an electrical quantity indicative of the amplitude of the received signal whenever said amplitude equals a predetermined maximum;

C. means responsive to the electrical quantity to set the gain of the amplifier in accordance with said quantity.

19. A facsimile receiver according to claim 18 in which said amplifier includes switching means periodically actuated to reset the gain of the amplifier during reproduction of the document.

20. A facsimile receiver according to claim 19 in which the switching means resets the energy storage element after each time interval corresponding to the reproduction of a line on the document, whereby the gain of the amplifier may be reset after each line.

21. A frequency compressor for use in connection with the transmission of a continuous electrical signal having a number of local minima defining signal segments extending there between, comprising:

A. variable threshold means for detecting the local minima in said signal;

B. means responsive to the minima detecting means for inverting alternate signal segments to thereby form a derived signal having frequency components corresponding to half the frequency of corresponding components of the signal from which it is derived, together with higher-order frequency components arising from the compression, and C. means for removing said higher-order components from the derived signal to thereby form a continuous frequency-compressed signal of half the frequency content of the continuous electrical signal.

22. A frequency compressor according to claim 21 in which the means for detecting the local minima comprises:

A. means forming a level-shifted, delayed replica of the signal to be frequency-compressed;

B. a comparator having said signal and said replica applied as inputs thereto and providing outputs indicative of the relative amplitudes of said inputs to thereby define said signal segments; and C. means applying said comparator outputs to the inverting means.

23. A frequency compressor according to claim 21 in which the means for inverting alternate signal segments comprises an amplifier whose gain is switched between positive and negative polarities in accordance with signals obtained from said minima detecting means.

24. A frequency compressor for use in connection with the transmission of a continuous electrical signal over a channel of limited bandwidth, said frequency compressor comprising:

A. variable threshold means for detecting local inflection points in said signal in which the local rate of change of the signal amplitude varies by an amount greater than a preselected threshold;

B. means responsive to the inflection detecting means for inverting alternate signal segments intermediate successive inflection points to thereby form a derrived signal having frequency components corresponding to half the frequency of corresponding components of the signal from which it is derrived; and C. means suppressing higher order frequencies generated by the inversion.

25. A facsimile transmitter for transmitting the contents of a document to a remote location comprising:

A. means for scanning the document and generating a continuous electrical signal indicative of its contents;

B. means for forming a level-shifted, time delayed replica of said signal

C. a comparator for comparing the instantaneous magnitude of said replica with the instantaneous magnitude of the signal itself and providing differing outputs dependent on whether the replica magnitude is greater or less than the signal magnitude, a change in outputs signalling passage through a local minimum, D. means for amplifying said signal with alternate first and second polerities determined by the outputs of said comparing means; and E. means for transmitting the amplified signal to a remote receiver.

26. Apparatus according to claim 25 in which the amplifying means includes;

A. a bistable device switched between first and second stable states by successive outputs from the comparator; and B. an amplifier whose gain is switched between first and second polarities in accordance with the state of said bistable device.

27. A facsimile transmitter for transmitting the contents of a document to a remote location comprising:

A. means for scanning the document and generating a continuous electrical signal indicative of its contents;

B. means for amplifying said signal with alternate first and second polarities as the signal passes through successive local minima; and C. means for transmitting the amplified signal to a remote receiver, said means including an amplitude modulator having means for selecting the modulation index of the signal, the modulation index setting means comprising:

1. a summing junction;
2. first weighting means connecting the output of the variable gain amplifier to said summing junction;
3. second weighting means connection to said summing junction a reference voltage corresponding to the comparator reference voltage; and
4. switching means for varying the second weighting means whereby the proportion of the weighting voltage applied to the summing junction may be varied,
5. An amplifier whose gain is switched between first and second polarities in accordance with the state of said bistable device.

28. A facsimile transmitter for transmitting the contents of a document to a remote location comprising:

A. means for scanning the document and generating a continuous electrical signal indicative of it contents;

B. means for amplifying said signal with alternate first and second polarities as the signal passes through successive local minima; and C. means for transmitting the amplified signal to a remote receiver;

D. means for limiting the maximum amplitude of the signal from said scanning means, said limiting means comprising:

1. an amplifier for amplifying the signal, the gain of the amplifier being varied in accordance with the peak amplitude of the signal during a given scanning interval.
2. a comparator for comparing the amplifier output with a reference voltage which is to determine the maximum amplitude of the signal;
3. a capacitor charged by the comparator for accumulating a magnitude corresponding to the peak amplitude of the signal during the given interval and discharged after the scanning of each line on the document;
4. switching means responsive to the accumulator for modifying the amplifier gain in inverse relation to the accumulator magnitude; and
5. means for periodically resetting the accumulator to thereby enable the re-establishment of the gain of the amplifier.

29. A facsimile receiver for reproducing the contents of a document in accordance with a continuous elecrical signal representative of a source signal derived from said document and transmitted to it from a remote transmitter after bandwidth-compression by inverting portions thereof, said receiver comprising:

A. means for amplifying said signal in an amplifier whose gain is dependent on the maximum amplitude components of said signal;

B. means for reinverting portions of the received signal corresponding to portions of the source signal which have been phase-inverted prior to transmission to thereby reconstitute said source signal;

C. means applying the reconstituted signal to a writing head to thereby reproduce said document; and D. again control unit including 1. an energy storage element;
2. means responsive to the received signal to store in said element an electrical quantity indicative of the amplitude of the received signal whenever said amplitude equals a predetermined maximum;

3. means responsive to the electrical quantity to set the gain of the amplifier in accordance with said quantity; and
4. switching means periodically actuated to reset the gain of the amplifier during reproduction of the document.

30. A facsimile receiver for reproducing the contents of a document in accordance with a continuous electrical signal representative of a souce signal derived from said document and transmitted to it from a remote transmitter after bandwidth-compression by inverting portions thereof, said receiver comprising:

A. means for amplifying said signal in a amplifier whose gain is dependent on the maximum amplitude components of said signal;
B. means for reinverting portions of the received signal corresponding to portions of the source signal which have been phase-inverted prior to transmission to thereby reconstitute said source signal; and
C. means applying the reconstituded signal to a writing head to thereby reproduce said document; and
D. means for demodulating the received signal prior to reinverting portions thereof, said demodulating means comprising:
   1. an oscillator providing an output at a frequency dependent on inputs applied thereto;
   1. a first bistable device driven by said oscillator;
   3. a demodulator
      i. having the output of the bistable device connected as a first input thereto;
      ii. having the output of said amplifier connected as a second input thereto;
      iii. responsive to said inputs to provide an output representative of said source signal;
   4. a zero crossing detector providing outputs indicative of the zero crossings of the modulated signal.

31. A facsimile receiver for reproducing the contents of a document in accordance with a continuous electrical signal representative of a source signal derived from said document and transmitted to it from a remote transmitter after bandwidth-compression by inverting portions thereof in accordance with a variable threshold means, said receiver comprising:

A. means for amplifying said signal in an amplifier whose gain is dependent on the maximum amplitude components of said signal;
B. means for reinverting portions of the received signal corresponding to portions of the source signal which have been phase-inverted prior to transmission to thereby reconstitute said source signal, said means comprising:
   1. an amplifier having an input and an output;
   2. a first rectifier poled in a first direction and connected in series with a first impedance between the amplifier input and output;
   3. a second rectifier poled in a direction opposite to the first rectifier and connected in series with a second impedance between the amplifier input and output;
   4. a first channel output lead connected to a node common to said first rectifier and first impedance for receiving signals corresponding to a first input polarity;

32. A frequency compressor for use in connection with the transmission of a continuous electrical signal having a number of local minima defining signal segments extending therebetween, comprising:

A. variable threshold means for detecting the local minima in said signal, said means comprising:
   1. means forming a level-shifted, delayed replica of the signal to be frequency-compressed;
   2. a comparator having said signal and said replica applied as inputs thereto and providing outputs indicative of the relative amplitudes of said inputs to thereby define said signal segments; and
   3. means applying said comparator outputs to the inverting means;
B. means responsive to the minima detecting means for inverting alternate signal segments to thereby form a derived signal having frequency components corresponding to half the frequency of corresponding components of the signal from which it is derived, together with higher-order frequency components arising from the compression; and
C. means for removing said higher-order components from the derived signal to thereby form a continuous frequency-compressed signal of half the frequency content of the continuous electrical signal.

* * * * *